United States Patent
Abrate et al.

(10) Patent No.: US 7,323,678 B2
(45) Date of Patent: Jan. 29, 2008

(54) OPTICAL DISPLACEMENT TRANSDUCER, DISPLACEMENT MEASUREMENT SYSTEM AND METHOD FOR DISPLACEMENT DETECTION THEREFROM

(75) Inventors: Silvio Abrate, Turin (IT); Guido Perrone, Turin (IT); Roberto Gaudino, Turin (IT); Davide Perla, Turin (IT)

(73) Assignees: Istituto Superiore Mario Boella sulle Techologie dell'Informazione e delle Telecommunicazioni, Turin (IT); Fondazione Torino Wireless, Turin (IT)

( * ) Notice: Subject to any disclaimer, the term of this patent is extended or adjusted under 35 U.S.C. 154(b) by 175 days.

(21) Appl. No.: 11/188,706

(22) Filed: Jul. 26, 2005

(65) Prior Publication Data
US 2006/0043268 A1    Mar. 2, 2006

(30) Foreign Application Priority Data
Aug. 24, 2004   (EP)   ................... 04020021

(51) Int. Cl.
*G01D 5/26* (2006.01)
*G01J 1/42* (2006.01)
*G01J 1/04* (2006.01)

(52) U.S. Cl. .................. 250/227.14; 385/12
(58) Field of Classification Search .......... 250/227.14, 250/227.11, 227.23; 385/12, 13
See application file for complete search history.

(56) References Cited

U.S. PATENT DOCUMENTS

| | | | |
|---|---|---|---|
| 4,293,188 A | | 10/1981 | McMahon |
| 4,631,401 A | * | 12/1986 | Parkhurst et al. ....... 250/227.21 |
| 4,861,131 A | * | 8/1989 | Bois et al. ..................... 385/12 |
| 5,473,156 A | * | 12/1995 | Pinnock et al. ........ 250/227.11 |
| 5,891,747 A | * | 4/1999 | Farah .......................... 438/31 |
| 6,365,072 B1 | * | 4/2002 | Katoot et al. .............. 264/1.24 |

FOREIGN PATENT DOCUMENTS

| | | |
|---|---|---|
| DE | 42 23 625 A1 | 1/1994 |
| EP | 0 623 803 A2 | 11/1994 |
| JP | 8-285709 | 11/1996 |

* cited by examiner

*Primary Examiner*—John R. Lee
(74) *Attorney, Agent, or Firm*—Nixon & Vanderhye P.C.

(57) ABSTRACT

An optical displacement transducer includes a transducing element comprising at least a first optical fiber, having a first end face substantially aligned along an axis and positioned with a small gap between said first end face and a second end face of a reception assembly, the transducer further comprising at least a light source coupled for transmission to first optical fiber and at least a photo-detector coupled for reception to the second optical fiber. The first end face and the second end face are displaceable along the axis and relatively with respect to each other, in order to follow the displacement of points associated to the first end face and second end face. The transducer is effective in detecting axial displacement simply and low cost.

23 Claims, 6 Drawing Sheets

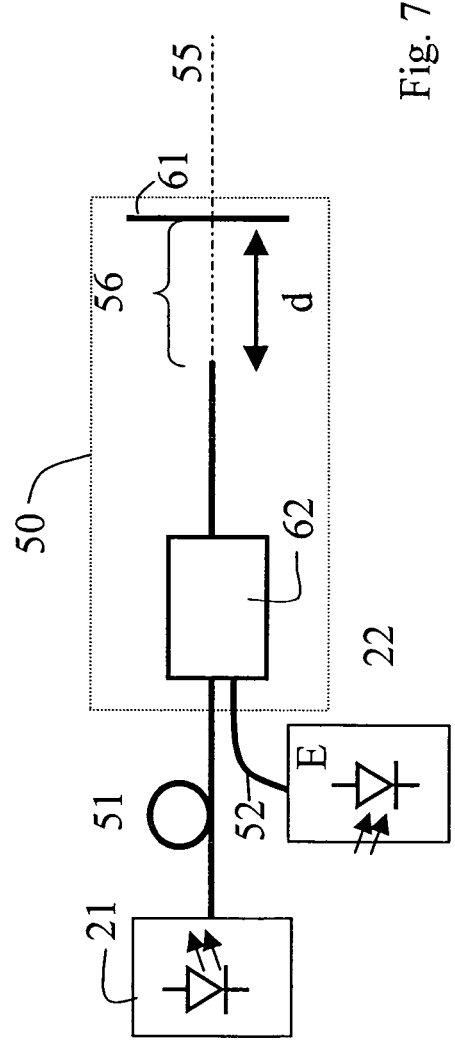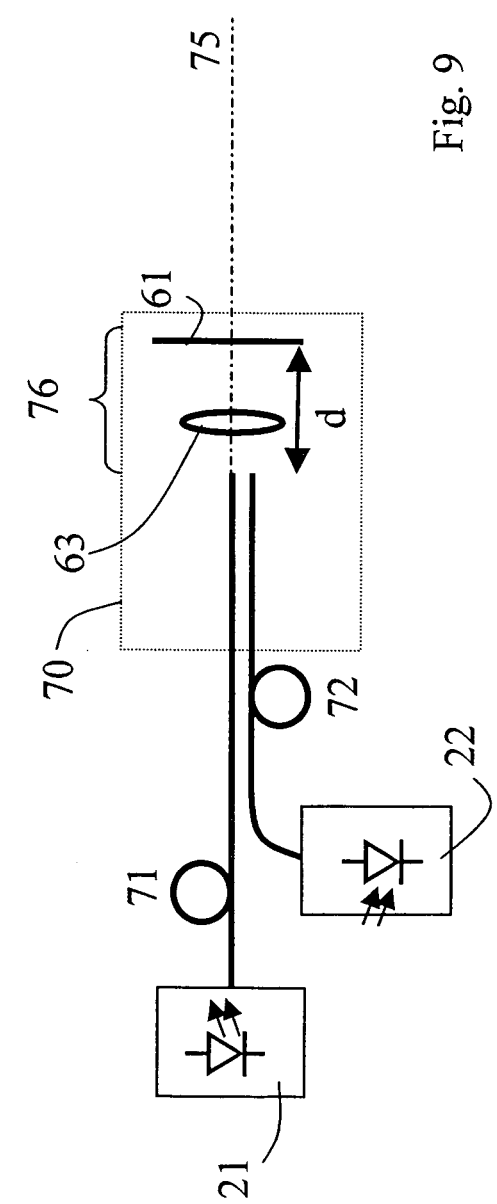

OPTICAL DISPLACEMENT TRANSDUCER, DISPLACEMENT MEASUREMENT SYSTEM AND METHOD FOR DISPLACEMENT DETECTION THEREFROM

FIELD OF THE INVENTION

The present invention relates to optical displacement transducers and it was developed by paying specific attention to the possible implementation through Polymer Optical Fiber (POF), having the main objective of applications such as monitor crack opening and evolution and measurement of displacements in electromagnetically noisy or highly flammable environments.

DESCRIPTION OF THE RELATED ART

Optical displacement transducers, that exploit optical fibers, are known from the prior art.

Optical displacement transducers based on optical fibers present several advantages, such as light weight, minimal, invasiveness and immunity to electromagnetic interferences. The latter property is particularly interesting because it allows the application to critical environments such as electromagnetically noisy industrial premises, storage areas of high flammable materials and structures exposed to electrostatic discharges during thunderstorms. Of great importance is also the minimal invasiveness, especially in the case of monitoring monumental buildings where all the measurement equipment must be as hidden as possible. This is achievable thanks to the reduced size of the fiber and to the use of the same fiber both for sensing and for data transmission allowing thus the positioning of the controlling electronic equipments in a remote location.

Such transducers are in general based on the principle of the so-called Gravel transducer, that includes two optical fibers, each cut to have end faces substantially perpendicular to an axis and positioned with a small gap between the end faces of the fibers. One fiber is mounted to maintain its end face stationary, for example, while the other is cantilevered to permit displacement of its end face. When the fiber axes lie on a common straight line, light propagating in one fiber will couple with maximum intensity into the other fiber.

An example of application of such an arrangement for measuring displacements is disclosed in the U.S. Pat. No. 4,293,188, where is provided an optoelectronic transducer suitable for converting small displacements into optical intensity or phase variations, which may then be converted into varying electric currents. A first optical fiber guide is disposed with its end face stationary, for example, while a second optical fiber guide is disposed so that its free end may be laterally displaced from the axis of the first guide in proportion to the parameter to be measured. Multimode glass optical fibers are used. The opposed faces of the cooperating fibers are equipped with or are used to illuminate regular arrays of equally spaced opaque, absorptive, or reflective grating systems providing intensity or phase modulation of the propagating light energy in proportion to wave guide deflection.

A similar transducer is also disclosed in the Japanese publication JP8285709.

Such transducers, however, being based on a radial displacement detection, only allow for measuring displacements up to the fiber core dimension, since the received power goes to zero once the two fibers are no longer aligned. This means that even using commercial multimode glass fibers having a core diameter of about 50 micrometers, such transducers just allow for measuring maximum displacements of about 50 micrometers.

To overcome such a limit it is necessary to use more expensive fiber bundles.

SUMMARY OF THE INVENTION

The object of the present invention is to provide an improved arrangement which allows for measuring displacements that exceed the fiber core dimension in a cost effective way.

According to the present invention, that object is achieved by means of a transducer having the features set forth in the claims that follow. The invention also relates to a corresponding displacement measuring system as well as to a corresponding displacement detection method.

In brief, the proposed arrangement provides for a displacement measurement system that is built around a low cost fiber optic transducer connected to electronic circuitry for the signal conditioning and elaboration. The transducer converts the measure of a displacement into a measure of a variation of current or voltage, by exploiting the variation in the photo-current detected at the output of a fiber optic system with link attenuation. In order to control the link attenuation two optical fibers are faced so that they are coupled through a small air gap and can increase their distance, moving only along their axes and maintaining the optical coupling. Alternatively, a reflection setup can be also used, where the second fiber is placed on the same side of the gap, as the first fiber, and included in a reception assembly that comprises a reflecting surface on the other side of the gap and directing means or deflecting means in order to perfection the coupling with the second optical fiber. In a variant to such refection setup only a fiber can be used for transmission and reception, using a suitable coupling device.

This allows for the measurement of displacements in the order of times the fiber core dimension.

In a preferred embodiment of the invention, it is provided for using Polymer Optical Fibers (POF) having large core diameter and high numerical aperture.

The extremely low cost of the proposed arrangement also allows for multiaxial transducers or simultaneous monitoring of several displacements, by simply replicating many times the basic transducer.

The light sources and detectors for the operation of the transducer are off-the-shelf LEDs and photodiodes, while the elaboration can be provided through a simple personal computer equipped with a digitizing card (DAQ) through a low noise multiple channel amplifier, according to a further inventive aspect of the proposed arrangement. The electrical bandwidth of each channel of the amplifier is limited depending on the specific measurement application to reduce the noise. Thus the whole set-up may be easily adapted also to monitor vibrations up to few kHz for different applications, without significant degradation of the performances.

BRIEF DESCRIPTION OF THE ANNEXED DRAWINGS

The invention will now be described, by way of example only, with reference to the annexed figures of drawing, wherein:

FIG. 1 shows a basic diagram of an optical displacement transducer according to the invention, FIG. 2 shows a detail of the optical displacement transducer of FIG. 1, FIG. 3 shows a schematic diagram of a measurement system including the optical displacement transducer of FIG. 1 and FIG. 4 is a diagram representing a variation of a received power as a function of displacement, in the measurement system of FIG. 3;

FIG. 6 shows a schematic diagram representing a multi-sensor measurement system based on the measurement system of FIG. 3;

FIG. 7 shows a block diagram of a second embodiment of the optical transducer according to the invention;

FIG. 9 shows a block diagram of a third embodiment of the optical transducer according to the invention;

DETAILED DESCRIPTION OF PREFERRED EMBODIMENTS OF THE INVENTION

Figure 1:
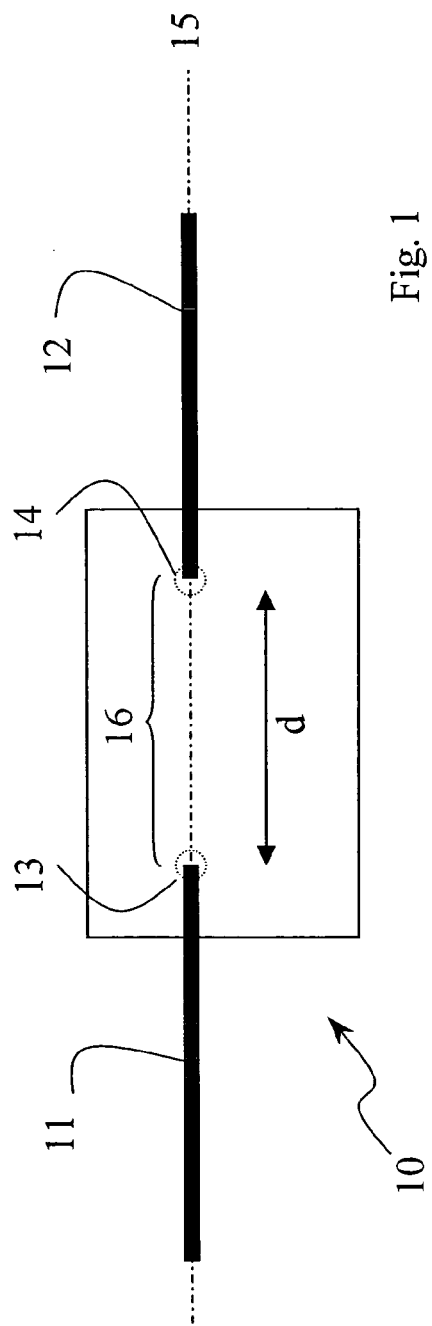

FIG. 1 shows a basic diagram of an optical displacement transducing element according to the invention.

Such a displacement transducing element, indicated as a whole with the reference number 10, includes a first optical fiber 11 and a second optical fiber 12.

The first optical fiber 11 is cut to have a first end face 13, substantially perpendicular to an axis 15.

The second optical fiber 12 is cut to have a second end face 14, substantially perpendicular to such axis 15 and positioned so as to face such first end face 13. The first end face 13 and the second end face 14 are thus aligned along the axis 15 and are divided by an air gap 16. With the reference d is indicated a displacement length between the first end face 13 and second end face 14 across the gap 16.

The first fiber 11 and the second fiber 12 are fixed to two objects, or, more in general, to two point that are relatively displaceable with respect to each other with at least a component of such displacement lying along axis 15 and whose relative displacement has to be detected. Such two objects or points are not shown in FIG. 1. For example, in a typical application to civil engineering, the two end faces 13 and 14 of the transducing element 10 can be fixed at the two sides of a crack in a wall.

Figure 2:
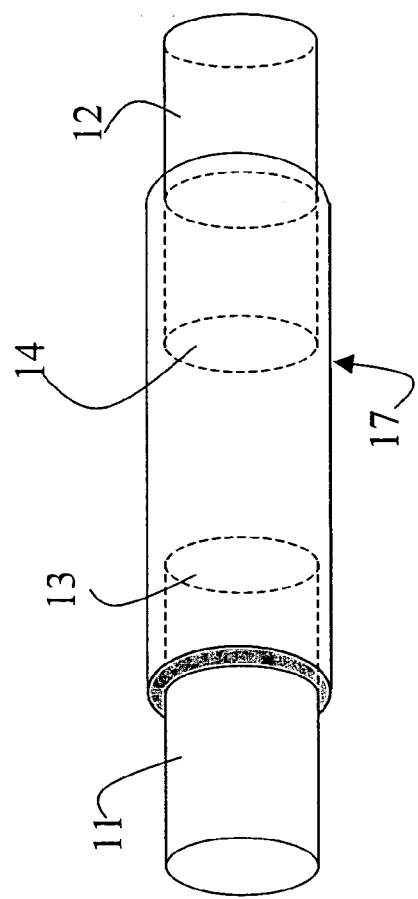

In FIG. 2 a detail of the transducing element 10 is shown, from which it can be seen that the first end face 13 of the first optical fiber 11 and the second end face 14 of the second optical fiber 12 are inserted into a proper sleeve 17, encompassing the whole length of the gap 16. Such a sleeve 17 provides for guiding movement along the axial direction and provides also a shield against dust and unwanted light coming from the surrounding environment.

Figure 3:
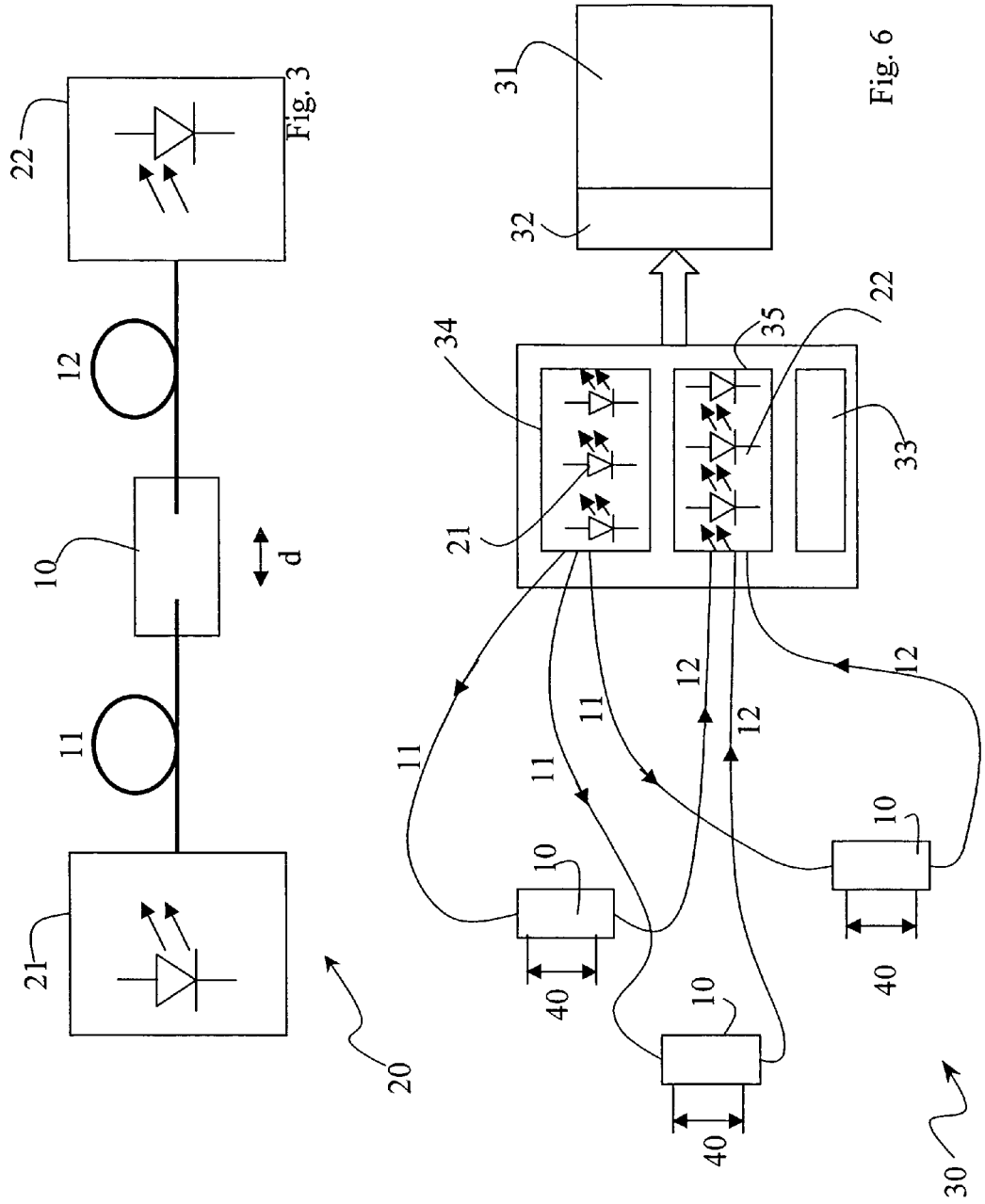

In FIG. 3 is shown a displacement transducer, indicated as a whole with the reference 20, including the transducing element 10.

With reference 21, a first light emitting diode (LED) complete with a corresponding power generator, is indicated. Such a LED 21 is connected as a light source to the other end, with respect to the first end face 13, of the first optical fiber 11. The light is transmitted through such first optical fiber 11 and the gap 16, reaching the second end face 14 of the second optical fiber 12, coaxially placed along axis 15. A photo-detector 22 is placed at the other end of the second optical fiber 12, measuring the intensity of the light that is transmitted through the whole transducer 20.

In a preferred embodiment, for the first optical fiber 11 and the second optical fiber 12, are used commercial PMMA step index Polymer Optical Fibers (POF) having a core diameter of 980 nm. Also other POF different from PMMA can be used. The choice of POF constitutes another inventive aspect of the proposed arrangement, since allows for using in association with the first optical fiber 11 and the second optical fiber 12 a low cost LED 21 and photodiode 22 as light transmitters and receivers, respectively. In particular, the LED 21 can be an off-the-shelf red emitting LED or a green emitting LED or also a LED of different color. Choice of the color is determined by the attenuation spectral characteristic of the specific POF considered.

The LED 21 is fed using a current generator built around a commercial voltage regulator integrated circuit. The photo-detector 22 includes a photodiode followed by a low noise amplifier.

The output of the photo-detector 22 can be either a current or a voltage, depending on the type of amplifier.

The fibers of the transducer are automatically aligned thanks to the enclosing sleeve 17, shown in FIG. 2, so that the light coming from the first optical fiber 11 is coupled to the optical fiber 12 through the small air gap 16. Since the transducing element 10 is sensitive to relative movements, it can be here supposed for simplicity that the first optical fiber 11 is fixed and only the second optical fiber 12 is moving.

Thus, summarizing, the optical displacement transducer 20 operates as follows.

In the case of a measurement of movements that make the second optical fiber 12 shift apart, at the beginning of the measurement session the two fiber end faces 13 and 14 are brought physically in contact. This ensures the maximum coupling of the transmitted light and thus a maximum value of current or voltage can be read at the photo-detector 22. The displacement d in axial direction of the second optical fiber 12, widens the gap 16 and reduces the light collected by such second optical fiber 12. Thus the optical power inciding on the photodiode in the photo detector 22 is accordingly reduced, lowering the current or voltage at the output of the amplifier. This way a displacement is converted into a current or voltage variation.

The same procedure, but in reverse order, can be applied to the case of a measurement of a displacement that brings the first optical fiber 11 closer to the second optical fiber 12. In this case, at the beginning of the measurement session the transducer 20 is set to the maximum reading for what concerns displacement (i.e., minimum output current or voltage) and then the narrowing of the gap 16 with displacement d makes the output current or voltage increase.

The advantage of using a transducer based on polymer fibers is also that it is possible to detect displacements up to few millimeters thanks to their large diameter (around 980 micrometers) and high numerical aperture (ranging around a 0.5 value). For instance, the same type of transducer made with conventional glass fibers, that have diameter around 9 micrometers and numerical aperture of 0.2, would have a useful range of only tenth of microns, besides requiring much more expensive laser sources and alignments of the connectors that must be by far more mechanically precise. To this regard, it must be also taken in account that POF fibers are easier to handle in fiber cutting and connection operations. This is particularly relevant when there is need of placing many sensor, i.e. many operations of cut, connect and align are necessary.

Figure 4:
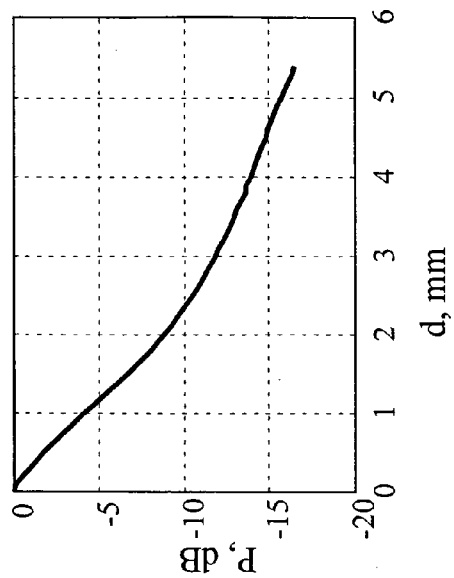

The typical response of the transducer, that is the variation of a relative power P coupled in the second optical fiber 12 with the displacement d between the two fiber tips is shown in FIG. 4.

In FIG. 6 it is shown a measurement system 30, suitable for crack monitoring, in which a plurality of transducing elements 10 are placed in correspondence of respective cracks 40.

Each of the transducing elements 10 receives through a respective first optical fiber 11 light from a respective LED 21 in a transmitter block 34 and transmits the light through a respective second optical fiber 12 to a respective photo-detector 22 in a receiver 35.

LEDs 21 are connected in series in the transmitter 34, in order to be driven by the same current and have the same residual fluctuations and thermal behaviour, while the receiver 35 in this case represent a multi-channel photo-detector, having at least three channels.

Block 31 represents a personal computer associated to a commercial digital acquisition board (DAQ) 32. The output current (or voltage) from the photo-detectors 22 is sent, through the DAQ 32 to the personal computer 31.

Suitable software programs loaded into the personal computer 31 can then evaluate the measurement results, plot the variations of positions with time and issue a warning if the reading increases over a predefined threshold. The DAQ 32 has a plurality of channels suitable for acquiring the signals from the plurality of transducing elements 10, in order to monitor simultaneously many displacements or to obtain a multi-axial measuring system.

In such channels the electrical bandwidth needed for monitoring is considered and the bandwidth of an amplifier is accordingly limited to reduce the noise. In fact, crack monitoring can be performed at low frequencies, so that it is possible to cut out the high frequency noise with a proper choice of the bandwidth. The whole set-up may be easily adapted also to monitor vibrations up to few kHz for different applications, without significant degradation of the performances.

To increase the resolution of the measuring system it is necessary to compensate the measured valued for the fluctuations of the light source. i.e. of the LED. In the proposed embodiment this is obtained by dedicating one of the channels of the DAQ 32 to measure the output of a further photodiode that is directly attached to a reference LED of the same type of the LED 21 used to feed the transducing elements 10 and connected in series with such a LED 21 in order to have the same bias point and experience the same current residual fluctuations. By this arrangement is advantageously avoided the need of a coupler that, besides being very expensive in comparison with the overall cost of the sensors, introduces also high insertion loss.

Another channel of the DAQ 32 is devoted to acquire the environmental temperature from a low cost commercial integrated electronic temperature sensor 33, e.g. TMP35 from Analog Devices, allowing for a compensation of the temperature effects, supposing that the various transducing elements 10 are roughly at the same temperature.

More accurate compensations, including not only temperature effects but also humidity, unwanted strains, aging, etc, can be obtained by connecting the reference LED to its photodiode through an uninterrupted reference fiber running parallel to the monitoring fiber, i.e. first fiber 11 and second fiber 12.

Figure 5:
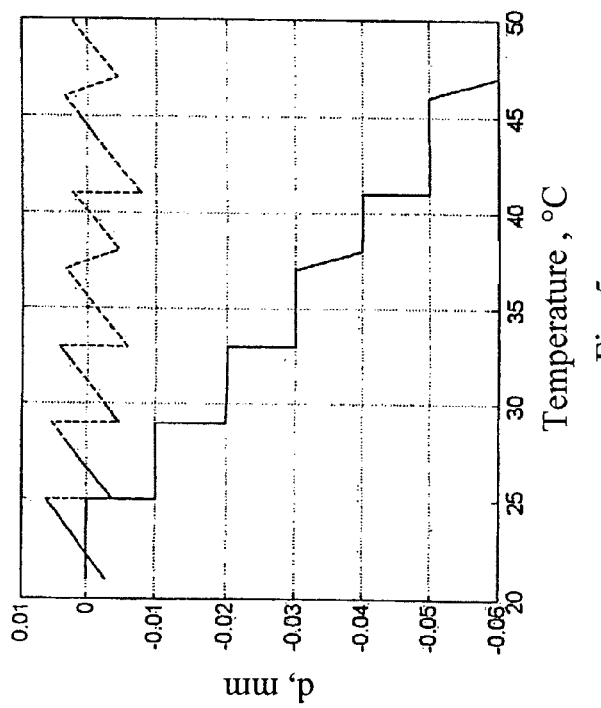
FIG. 5 is a diagram representing the influence of temperature on the performances of the measurement system of FIG. 3.

Applicant has tested the behaviour of the measuring system 30 for crack monitoring in an environmental chamber from −20 to +60° C. a, with different degrees of humidity; the dependence from temperature of the response of the transducing element 10 with temperature has been memorized in order to obtain correction values for the measurements during normal operation. After correction for temperature and LED source variations, there are residual fluctuations in the displacement lower than few percents. Such a value can be considered adequate, taking into account the very low cost of the equipment. An example of the results is shown in the diagram of FIG. 5 where is plotted the variation of the measured value for displacement d against the temperature T, from the condition at room temperature, before and after the temperature compensation. In this case, the first optical fiber 11 has been pulled apart to determine a gap of 1 mm with respect to the second optical fiber 12 and it has been verified that at room temperature the sensor reading for displacement d was 1 mm. Such a value has been taken as zero value in the diagram of FIG. 5, e.g. zero variation of displacement. By increasing the temperature T up to 50° C. a progressive fictitious reduction of the displacement due to the variation of the fiber length with temperature has been recorded (solid line in FIG. 5). As it can be seen, upon application of the proper temperature compensation the residual variations are lower than ±10 μm (dashed line in FIG. 5). It should be noted that this value corresponds to the resolution of the transducer in use and this also explains the staircase aspect of the curves in FIG. 5.

In FIG. 7 it is shown a further embodiment of the optical displacement transducer according to the invention, indicated a whole by the reference 50.

The displacement transducer described with reference to FIGS. 1 and 2 is based on the measurement of the transmitted power through an air gap, but the same transducer can be implemented using a reflection-based setup. This approach may ease laying the sensor in some applications since all the fibers will remain on the same side of the moving parts. With respect to the setup previously described with reference to FIGS. 1 and 2, the embodiment of FIG. 7 has a reduced detectable displacement range, but a better resolution, due to a higher per-unit-length attenuation since light propagates twice in the air gap, although the dynamics is limited by the Fresnel reflections at the fiber endface.

Thus, with reference to FIG. 7, in the transducer 50 the LED 21 is coupled to a first optical fiber 51, that is fixed at one of the two points or parts whose relative displacement d across a gap 56 has to be measured and along an axis 55 is facing a reflective surface 61, i.e. a mirror, that is attached to the other moving part or point on the other side of gap 56.

The light reflected from the reflective surface 61 thus passes again through the gap 56 along the axis 55 and is collected back by the same optical fiber 51. Then the reflected light is separated from the incident light in fiber 51 using a directional coupler 62 and routed to the photo-detector 22 through a suitable second fiber 52.

This implementation is mechanically simple and stable thanks to the usage of a directional coupler although it introduces non negligible insertion loss.

The reflection based setup as described with reference to FIG. 7, can have a further embodiment for the receiving side, as shown in FIG. 9, where another fiber is used to collect the reflected light.

In this case a transducer 70 is shown where the light coming from the LED 21 through the feeding fiber 71, along an axis 75 and across a gap 76, is reflected from the mirror 61, collected back by the second fiber 72 and routed to the photo-detector 22.

It is pointed out that, although strictly speaking the second optical fiber 72 in this case does not lie exactly on the same axis 75 on which the first optical fiber 71 is aligned, the difference for what concerns the optical path and the width of the gap 56 is negligible. Further, in this case, to maximize the power collected by the second fiber 72 a properly designed lens 63 is provided. It is possible also to use a curved mirror as reflecting surface 61. The transducing element 70 avoids the excess insertion loss associated with the directional coupler 62.

The reflection setup described with reference to FIGS. 7 and 9 is also suitable for measuring vibrations and obtaining an accelerometer if the mirror 61 is mounted on a oscillating means, such as a cantilever, fastened to the vibrating surface. In this case the rigidity of the cantilever and the mass of the mirror have to be properly designed in order to obtain the desired damping and resonant frequency. This type of transducer is particularly interesting for monumental structural monitoring applications because it allows the detection of vibrations without requiring of providing in situ electrical power, as needed in capacitive accelerometers. This makes impossible to start fire. Another application can be in the field of intrusion detection.

The transducer can be miniaturized using MEMS technology: in this case the cantilever and the mirror are fabricated in silicon and the fiber is automatically aligned etching a V-groove in the substrate.

Figure 8:
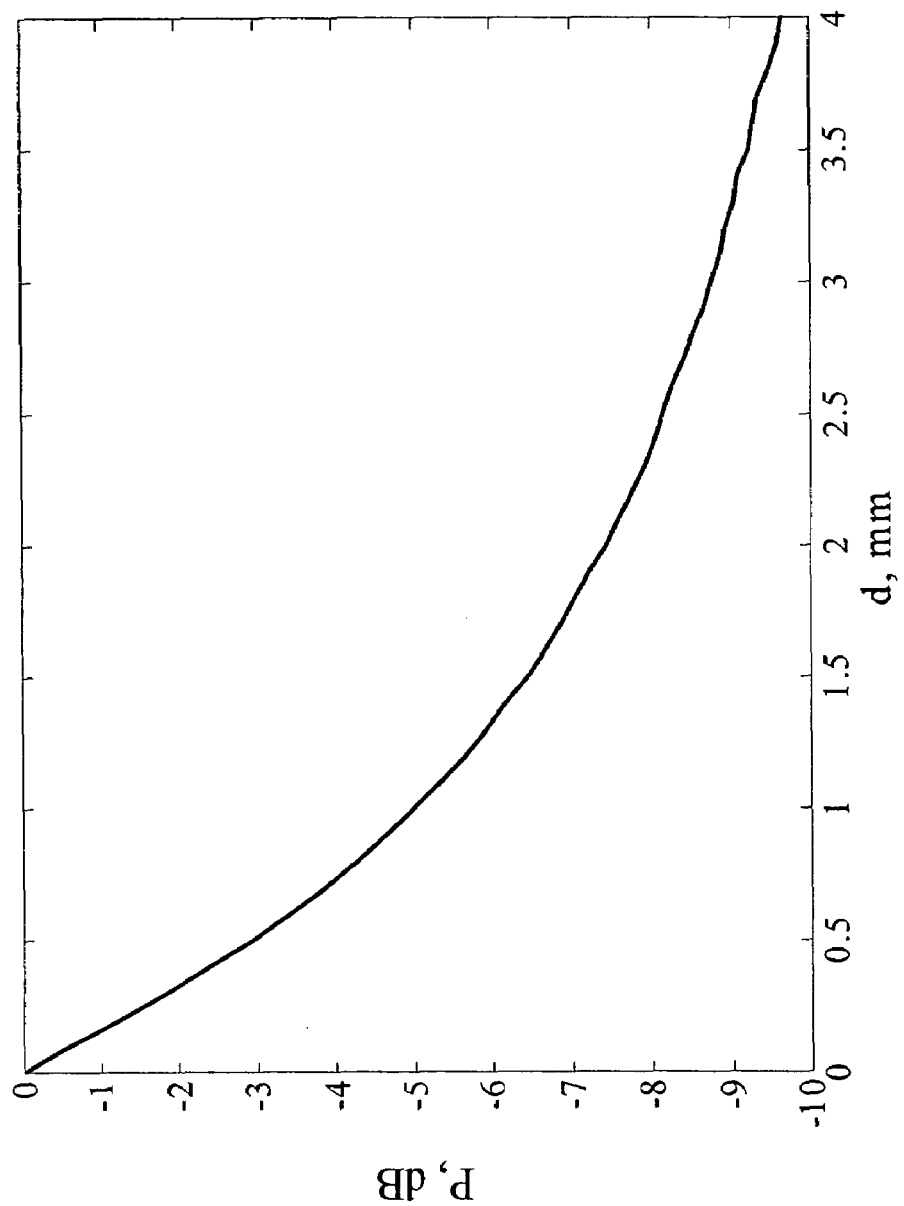
FIG. 8 is a diagram representative of the responsivity of the transducer of FIG. 7.

An example of the typical response of the transducer 50 is reported in FIG. 8 where it is plotted the received power P against the displacement d between the feeding fiber 51 and the reflecting surface 61.

The dynamics is limited by the Fresnel reflections at the fiber endface.

Figure 10:
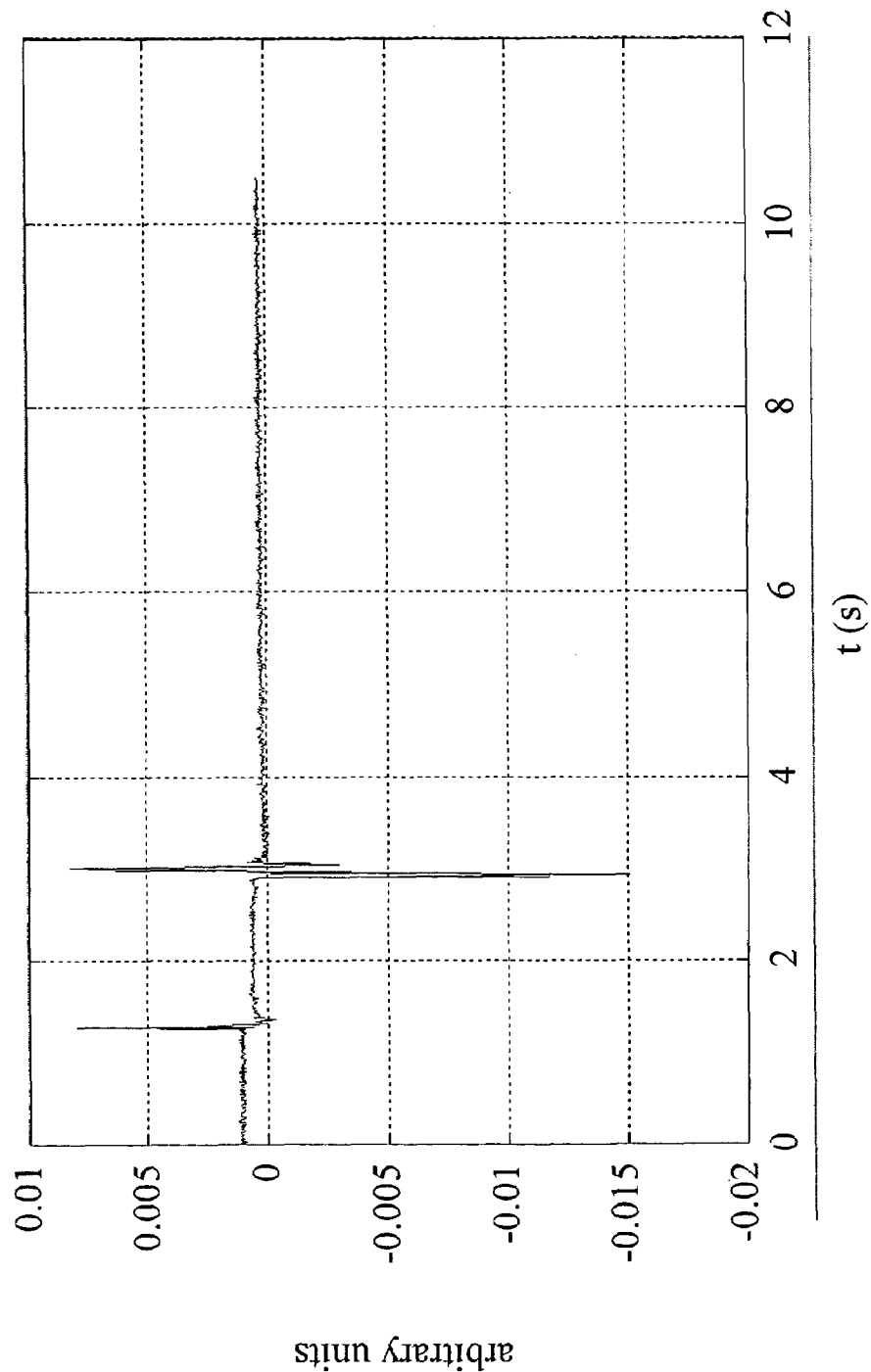
FIG. 10 is a diagram representative of the behaviour of the optical transducer according to the invention in a vibration measurement configuration.

As already mentioned, the setup can be used to detect vibrations. An example of the reading of the transducer when exposed to vibrations is shown in FIG. 10, where such reading is represented in arbitrary units as a function of time t.

The proposed transducer, in its various embodiments shown above, is intrinsically uni-axial, but a multi-axis sensor can be easily obtained by grouping together two or three uni-axial transducers, thanks to their low costs. Of course in this case also the electronic circuitry has to be properly replicated, in a way similar to that shown for the system schematically shown in FIG. 5, provided that transducing elements 10 are orientated along the desired axes. By way of example, in the case of a measuring system operating on three axes plus the reference, four LEDs connected in series are necessary for the transmitter. Similarly, at the receiver side a four-channel photo-detector system has to be used.

As mentioned the sensitivity of the measuring system is currently around 10 μm in a useful range going up to about 6 mm. This working range is comparable with other types of commercial sensors such as those based on Bragg gratings and is already functional to monitor cracks in walls. However, should the application require an extended range, this can be achieved using higher quality optoelectronic components and/or noise reduction methods such as lock-in amplifier techniques by properly modulating the input LED 21. It is important to note that the proposed measuring system has an accuracy that is only slightly lower than some commercial ones, but requires a much simpler interrogation unit and has an overall very low cost.

It is apparent that, although the proposes transducer has been developed in association with application in monitoring of cracks in buildings, either temporary or permanent, and, in particular, the performances for what concerns the maximum span and resolution has been defined with reference to such a crack monitoring activity, the low costs of the equipment suggest applications for widespread monitoring of buildings, in a structural analysis approach. The scope of the transducer according to invention extends also the measure of weight, pressure, pull, and, more in general, of forces, as well as of low frequency oscillations, provided that a suitable mechanism to convert such quantities in a displacement of the optical fibers is associated to an optical displacement transducer that includes at least a first first optical fiber, having a first end face substantially aligned along an axis and positioned with a small gap between said first end face and a second end face of a reception assembly, at least a light source coupled for transmission to said first optical fiber and at least a photo-detector coupled for reception to said second optical fiber, wherein said end faces are displaceable along said axis and relatively with respect to each other.

Consequently, without prejudice to the underlying principle of the invention, the details and embodiments may vary, also significantly, with respect to what has been described in the foregoing, by way of example only, without departing from the scope of the invention as defined by the claims that follow.

By way of example, the processing means operating on the signal provided by the transducer can be a personal computer, but also any other type of microcontroller suitable for processing such an information. In this respect, a microcontroller with integrated digital acquisition board can be chosen.

The invention claimed is:

1. An optical displacement transducer, including a transducing element comprising at least one first optical fiber, having a first end face substantially aligned along an axis and positioned with a small gap between said first end face and a second end face of a reception assembly, said transducer further comprising at least one light source coupled for transmission to said first optical fiber and at least one photo-detector coupled for reception to said reception assembly, said at least first optical fiber and said reception assembly being coupled through said small gap in order to control a corresponding link attenuation, said first end face and second end face being displaceable along said axis and relatively with respect to each other, in order to follow the relative displacement (d) of points associated to said first end face and second end face, wherein said at least one first optical fiber is a Polymer Optical Fiber (POF) having high numerical aperture in a value range around 0.5.

2. The transducer of claim 1, wherein said reception assembly includes a second optical fiber having a second end face substantially aligned with said first optical fiber along an axis and positioned with a small gap between said first end face and second end fact, said at least one photo-detector being coupled for reception to said second optical fiber and in that said second optical fiber is also a Polymer Optical Fiber (POF) having high numerical aperture in a value range around 0.5.

3. The transducer of either claim 1, wherein said first end face and second end face are inserted in an alignment sleeve.

4. The transducer of claim 1 wherein said reception assembly includes a reflecting surface and a second optical fiber fixed to the same point or part to which said first fiber is fixed.

5. The transducer of claim 4, wherein said reception assembly includes a directional coupler associated to said first optical fiber and to a second optical fiber, suitable for directing the light reflected by said reflecting surface to said second optical fiber.

6. The transducer of claim 4, wherein the transducer includes optical means for deflecting the light reflected by said reflecting surface in said second optical fiber.

7. The transducer of claim 6, wherein said optical means include a lens.

8. The transducer of claim 4, wherein said reflecting surface is mounted on an oscillating means.

9. The transducer of claim 1 wherein said light source includes at least one light emitting diode and said photo-detector includes at least one photodiode.

10. The transducer of claim 1 wherein said first and second optical fibers are Polymer Optical Fibers.

11. A displacement measuring system comprising at least one transducer associated to processing means, wherein said transducer is a transducer according to claim 1 and said processing means are configured for analyzing a current or a voltage signal generated by said photo-detector.

12. The system of claim 11, wherein said processing means include a digital acquisition board.

13. The system of claim 12, wherein said digital acquisition board includes a plurality of acquisition channels.

14. The system of claim 13, wherein the system includes a plurality of transducers associated to said plurality of channels of the digital acquisition board.

15. The system of claim 14, wherein the transducing elements of said transducers are oriented along different axes.

16. The system of claim 11, wherein it includes a temperature sensor for compensating temperature effects.

17. The system of claim 11, wherein the system includes a further photodiode directly attached to a reference light emitting diode of the same type of and connected in series with the light emitting diode coupled to said transducer in order to compensate fluctuations of the light source.

18. The system of claim 17, wherein said reference LED is connected to said further photodiode through an uninterrupted reference fiber running parallel to the first optical fiber and the second optical fiber.

19. A method for displacement detection, including the operation of measuring the displacement of at least two points relatively displaceable with respect to each other, wherein includes the operation of coupling to said at least two points a transducer according to claim 1.

20. The method of claim 19, wherein the method includes the operations of:
associating said first end face and said second end face to said two points relatively displaceable with respect to each other;
measuring the variation of said current or voltage signal generated by the photo detector by a measuring system according to claim 11.

21. The method of claim 19, wherein the method includes the operations of:
including in said processing means a digital acquisition board, and
compensating the measurement of the photo detector for temperature fluctuations by acquiring the temperature sensor measurement through a channel of said digital acquisition board.

22. The method of claim 19, wherein the method includes the operation of compensating for light source fluctuations by acquiring the measurement of said further photodiode attached to a reference light emitting diode.

23. The transducer of claim 10, wherein the Polymer Optical Fiber has a large core diameter and high numerical aperture.

* * * * *